US006955336B2

(12) United States Patent
Bircann et al.

(10) Patent No.: US 6,955,336 B2
(45) Date of Patent: Oct. 18, 2005

(54) SLEEVELESS SOLENOID FOR A LINEAR ACTUATOR

(75) Inventors: Raul A. Bircann, Penfield, NY (US); Dwight O. Palmer, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/777,471

(22) Filed: Feb. 6, 2001

(65) Prior Publication Data

US 2002/0104977 A1 Aug. 8, 2002

(51) Int. Cl.[7] .................... F16K 31/02
(52) U.S. Cl. .................... 251/129.15
(58) Field of Search .................... 251/124.15, 355, 251/124.1, 124.16

(56) References Cited

U.S. PATENT DOCUMENTS

| | | | | |
|---|---|---|---|---|
| 3,921,111 | A | 11/1975 | Kowalski | |
| 4,153,890 | A * | 5/1979 | Coors | 335/260 |
| 4,527,590 | A * | 7/1985 | Kolze | 137/596.17 |
| 4,729,252 | A * | 3/1988 | Huber et al. | 74/417 |
| 4,855,702 | A | 8/1989 | Swanson | |
| 4,873,959 | A * | 10/1989 | Law et al. | 123/458 |
| 5,144,272 | A * | 9/1992 | Nishimura | 251/129.15 |
| 5,362,209 | A * | 11/1994 | Day | 123/357 |
| 5,460,146 | A * | 10/1995 | Frankenberg | 123/568.21 |
| 5,699,995 | A * | 12/1997 | Robertson, III | 251/129.15 |
| 5,779,220 | A * | 7/1998 | Nehl et al. | 123/568.26 |
| 5,782,267 | A * | 7/1998 | Yoo | 137/596.17 |
| 5,804,962 | A * | 9/1998 | Kather et al. | 324/207.16 |
| 5,947,092 | A * | 9/1999 | Hussey et al. | 123/568.26 |
| 5,984,261 | A * | 11/1999 | Akita | 251/118 |
| 6,053,472 | A * | 4/2000 | DeLand | 251/129.11 |
| 6,230,673 | B1 * | 5/2001 | Sugimoto et al. | 123/90.11 |
| 6,260,522 | B1 * | 7/2001 | Stolk et al. | 123/90.11 |
| 6,313,726 | B1 * | 11/2001 | Golovatai-Schmidt et al. | 335/220 |
| 6,315,268 | B1 * | 11/2001 | Cornea et al. | 251/129.15 |

FOREIGN PATENT DOCUMENTS

| | | |
|---|---|---|
| DE | 2433775 | 5/1975 |
| DE | 9107436.3 | 2/1991 |
| GB | 2184604 A | 6/1987 |

OTHER PUBLICATIONS

European Search Report 02075063.4-2208 21.01.03.

* cited by examiner

*Primary Examiner*—Edward K. Look
*Assistant Examiner*—John K. Fristoe, Jr.
(74) *Attorney, Agent, or Firm*—Patrick M. Griffin

(57) ABSTRACT

An improved electric solenoid for providing linear mechanical actuation. The outer polepiece of the solenoid is provided with an axial, self-lubricated, non-magnetic bearing for closely supporting and centering an actuating shaft extending coaxially from the solenoid armature. Preferably, the radial tolerance between the diameters of the bearing inner bore and the shaft is as small as in practically possible without inducing drag of the shaft in the bearing, permitting reduction of the air gap between the armature and the polepieces to a minimal thickness. Preferably, the armature is axially tapered to avoid contact of the armature with the polepieces as a result of residual tolerances between the bearing and shaft. A significant increase in actuating force is realized in comparison with a prior art solenoid, and the improved solenoid may be used in any desired orientation.

10 Claims, 4 Drawing Sheets

SLEEVELESS SOLENOID FOR A LINEAR ACTUATOR

TECHNICAL FIELD

The present invention relates to electric solenoids as used in mechanical linear actuators; more particularly, to such solenoids intended for continuous, controlled linear travel between two extremes; and most particularly, to such solenoids as may be required to operate without regard to orientation.

BACKGROUND OF THE INVENTION

Electric solenoids are well known in electrical engineering and are widely used as actuating components in electromechanical actuators. A typical electric solenoid consists of a plurality of windings of an electric conductor about north and south polepieces. When current is passed through the windings, a characteristic toroidal magnetic field is produced having field lines at the axis which are parallel to the axis. A ferromagnetic armature is slidably disposed in an axial bore in the polepieces. An axial force is exerted by the magnetic field on the armature which tends to displace the armature axially. The strength of such force can be varied by varying the current flowing through the windings. Thus, by attaching the armature to a shaft, a solenoid may be adapted readily to provide linear mechanical actuation of a device to which it is attached. Solenoids are probably the commonest type of such actuators in use today.

The maximum force which may be exerted on the armature is in part a function of the axial size and stability of the cylindrical air gap between the armature and the polepieces. Ideally, the thickness of the air gap is zero, but conversely, the armature must not touch the polepieces. Further, the armature is not spontaneously centered in the bore, and non-axial magnetic vectors within the bore destabilize centering of the armature, resulting in unpredictable variances in the size and shape of the air gap and in the corresponding response of the armature.

It is known in the art to provide a lubricious, non-magnetic, cylindrical sleeve in the air gap to keep the armature centered in the polepieces and to function as a journal bearing to facilitate low-friction motion of the armature. Such a sleeve can reduce the centering problem but in itself still contributes to the thickness of the non-magnetic gap between the armature and the polepieces, thus limiting the maximum actuating force of the solenoid.

Further, because of necessary tolerances between the sleeve and the armature and between the sleeve and the polepieces, the armature may still be unacceptably decentered by gravity if the actuator is used in orientations wherein the actuator axis is inclined more than about 30° from vertical. Thus, prior art solenoid actuators can impose serious engineering design restrictions in their use.

What is needed is an improved solenoid which may be used in any orientation without loss in effectiveness, wherein the thickness of the gap between the armature and the polepieces is minimized and controlled to be substantially cylindrical without resort to a guiding sleeve therein.

SUMMARY OF THE INVENTION

The present invention is directed to an improved solenoid for providing linear actuation. The outer polepiece of the solenoid is provided with an axial, self-lubricated, non-magnetic journal bearing for supporting an actuating shaft extending coaxially from the solenoid armature. Preferably, the radial tolerance between the diameters of the bearing inner bore and the shaft is as small as in practically possible without inducing significant drag of the shaft in the bearing. This permits reduction of the air gap between the armature and the polepieces to a minimal thickness. Preferably, the armature is axially tapered slightly to avoid contact with the polepieces as a result of residual tolerances between the bearing and shaft. A significant increase in actuating force is realized in comparison with a prior art solenoid actuator.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings, in which.

DESCRIPTION OF THE PREFERRED EMBODIMENT

Figure 1:
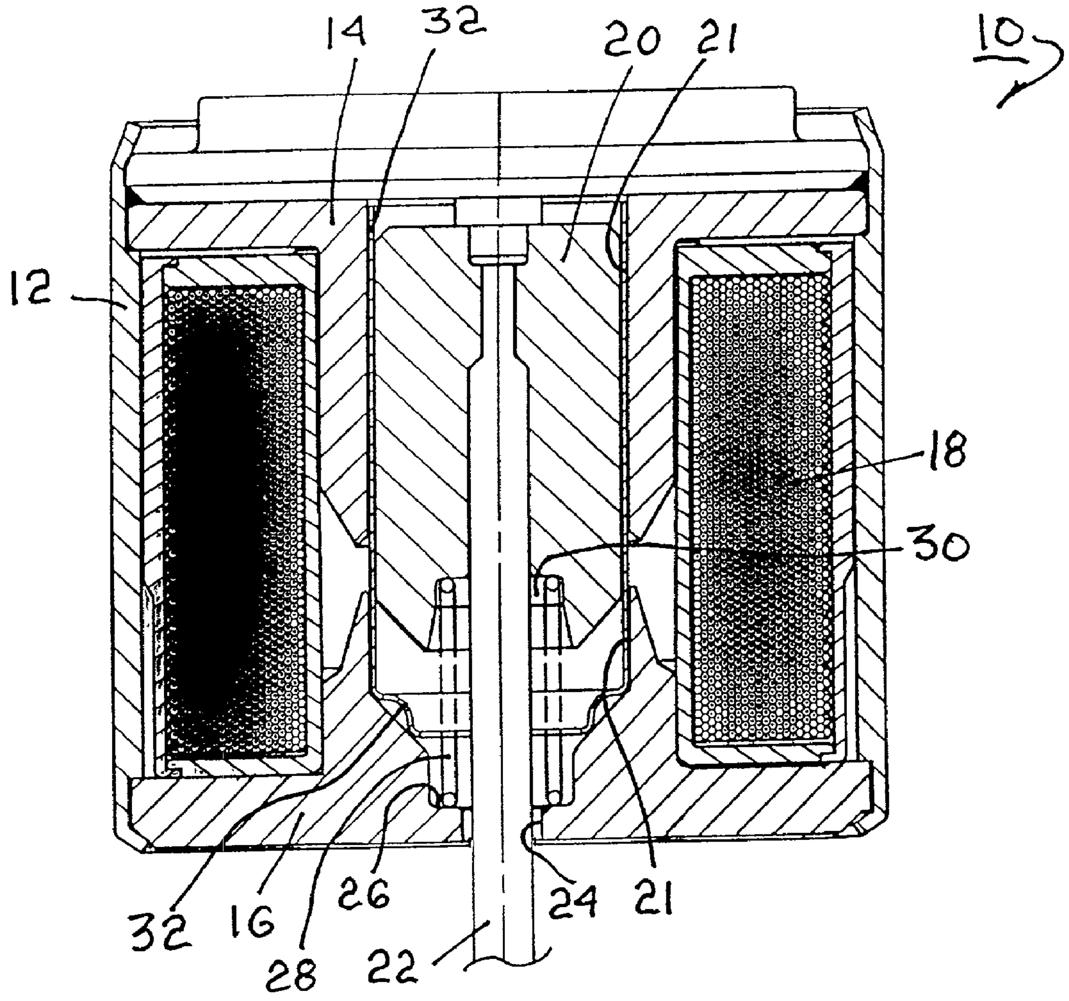
FIG. 1 (PRIOR ART)
FIG. 1 is a cross-sectional view of a prior art solenoid actuator.

The benefits afforded by the present invention will become more readily apparent by first considering a prior art solenoid actuator. Referring to FIG. 1, a prior art actuator 10 includes a housing 12 containing first and second pole pieces 14, 16, respectively, and a plurality of windings 18 about the polepieces. A ferromagnetic armature 20 is slidably disposed within a stepped first axial bore 21 in the pole pieces. An actuating shaft 22 is axially disposed and retained within armature 20 and extends from housing 12 via a second axial bore 24 in polepiece 16 for connection to work. Step 26 in bore 21 receives a coil spring 28 disposed in compression between step 26 and a well 30 in armature 20 for biasing the armature into the solenoid. A generally cylindrical non-magnetic sleeve 32 surrounds armature 20 and spring 28 for slidably guiding and centering the armature axially of the polepieces. Typically, the sleeve is formed of a non-galling non-ferromagnetic material such as stainless steel or ceramic, and either the sleeve or the armature may be coated with any of various well-known dry lubricants.

Figure 2:
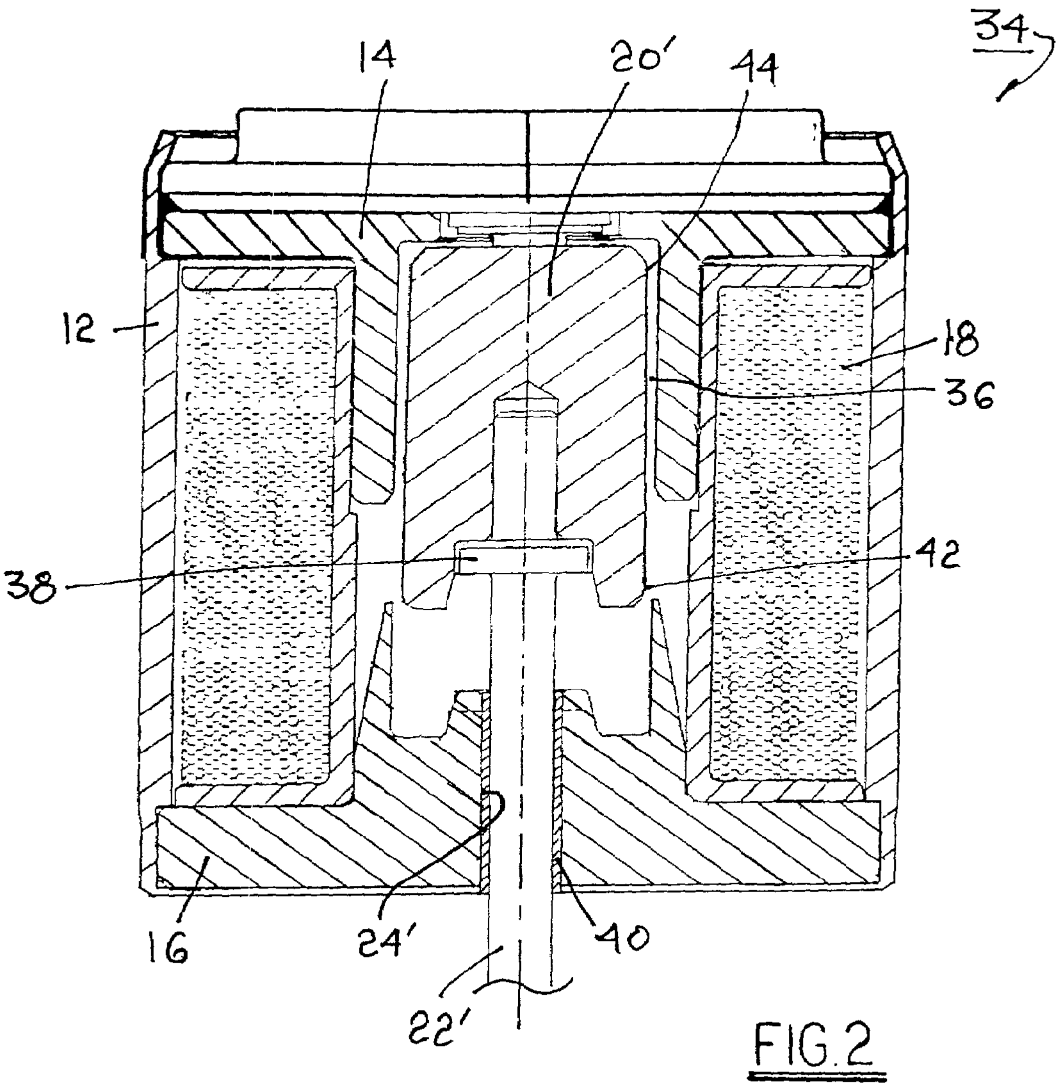
FIG. 2 is a cross-sectional view of a solenoid actuator in accordance with the invention.

Referring to FIG. 2, a first embodiment 34 of an improved and sleeveless solenoid actuator in accordance with the invention comprises several elements analogous to elements in prior art actuator 10: housing 12, first and second polepieces 14,16, and windings 18. Sleeve 32 is omitted. Air gap 36 is shown substantially larger than to scale for illustration purposes; preferably, the distance between first polepiece 14 and armature 20' is on the order of a small fraction of a millimeter. A shaft 22' is press-fit into armature 20' and may be provided with an annular flange 38 to spread the working load of the shaft against armature 20'. An axial bore 24' in second polepiece 16, alternative to bore 24 in the prior art actuator, retains a sleeve bearing 40 for radially supporting shaft 22' in axial motion. As already described, shaft 22' is preferably fitted to the bore in bearing 40 as closely as possible without engendering drag on the shaft.

Bearing 40 is coated with a permanent dry lubricant such as a fluorocarbon polymer; A0 preferably, bearing 40 is formed of a commercially-available coated metal element, for example, a Norglide bearing available from Saint-Gobain Performance Plastics Corporation, Wayne, N.J., USA.

Preferably, the axial length of bearing 40 is at least 1.5 times the diameter of shaft 22' to minimize wobble of the shaft in the bearing and resulting cocking of the armature in the polepieces. To accommodate the small tolerances necessary between the shaft and bearing, preferably the armature is tapered slightly to be frusto-conical having a cone angle substantially equal and opposite to the cone angle describable by the excursion limit of the shaft in the bearing, to provide the absolute minimum thickness of air gap while positively precluding the armature from striking the polepieces. Thus, air gap 36 is slightly thinner at the lower end 42 of armature 20' and slightly thicker at the upper end 44. Because the air gap is substantially fixed in size and shape and the armature cannot strike the polepieces, solenoid actuators in accordance with the invention may be used freely without regard to spatial orientation. This feature can be extremely useful, for example, in fitting an EGR valve into the engine compartment of a vehicle.

Figure 3:
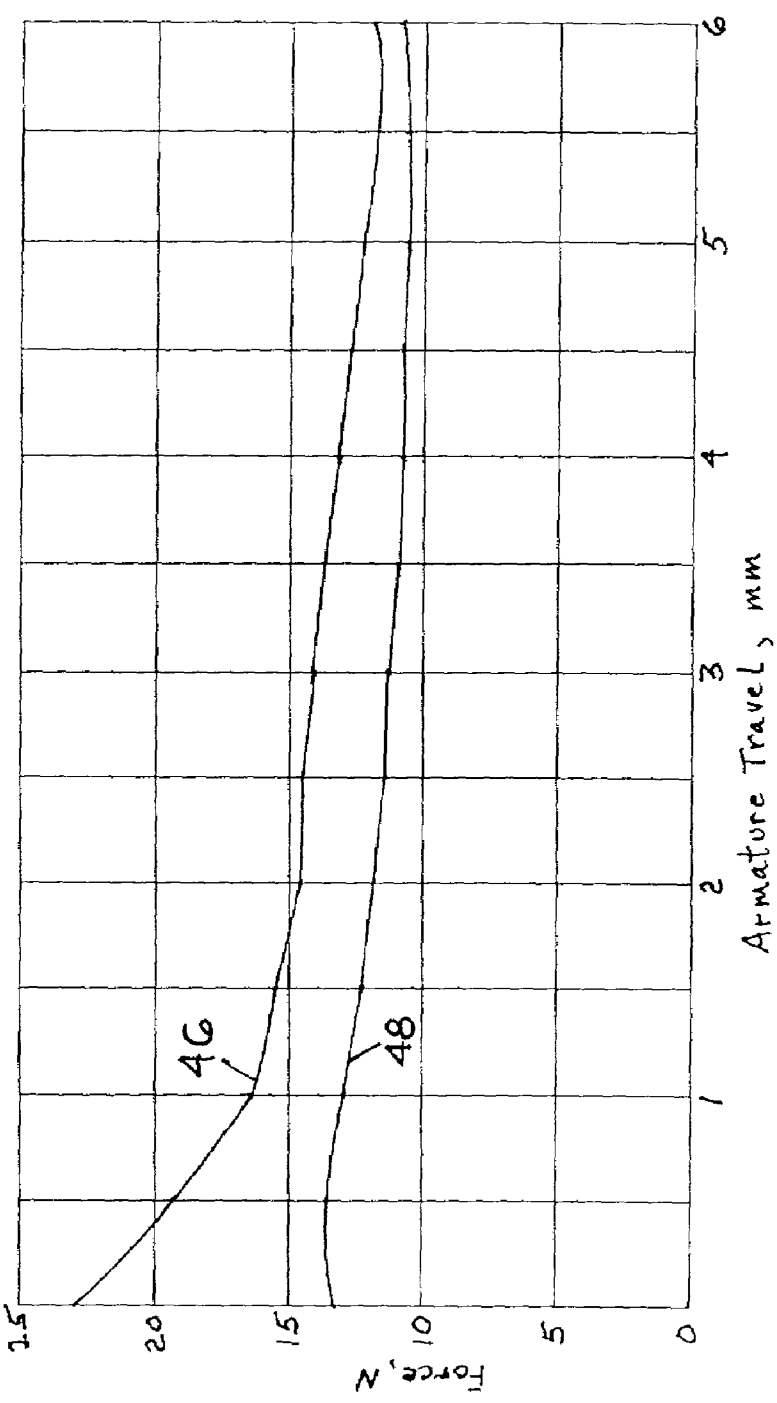
FIG. 3 is a graph showing actuator force as a function of armature travel for the actuators shown in FIGS. 1 and 2.

Referring to FIG. 3, the force advantage of removing the sleeve and narrowing the air gap in a solenoid actuator is clearly seen, the upper performance curve 46 representing improved actuator 34 and the lower curve 48 representing prior art actuator 10. An improvement of about 20% is found over most of the range of armature travel, and 68% at the start of armature travel. The latter is highly significant because this is the force available to, for example, begin opening a valve, at the time when the greatest pressure difference exists across the valve (greatest resistance to opening). Thus, a solenoid actuator in accordance with the invention might be made about 20% smaller and lighter than a prior art actuator for a given application.

Figure 4:
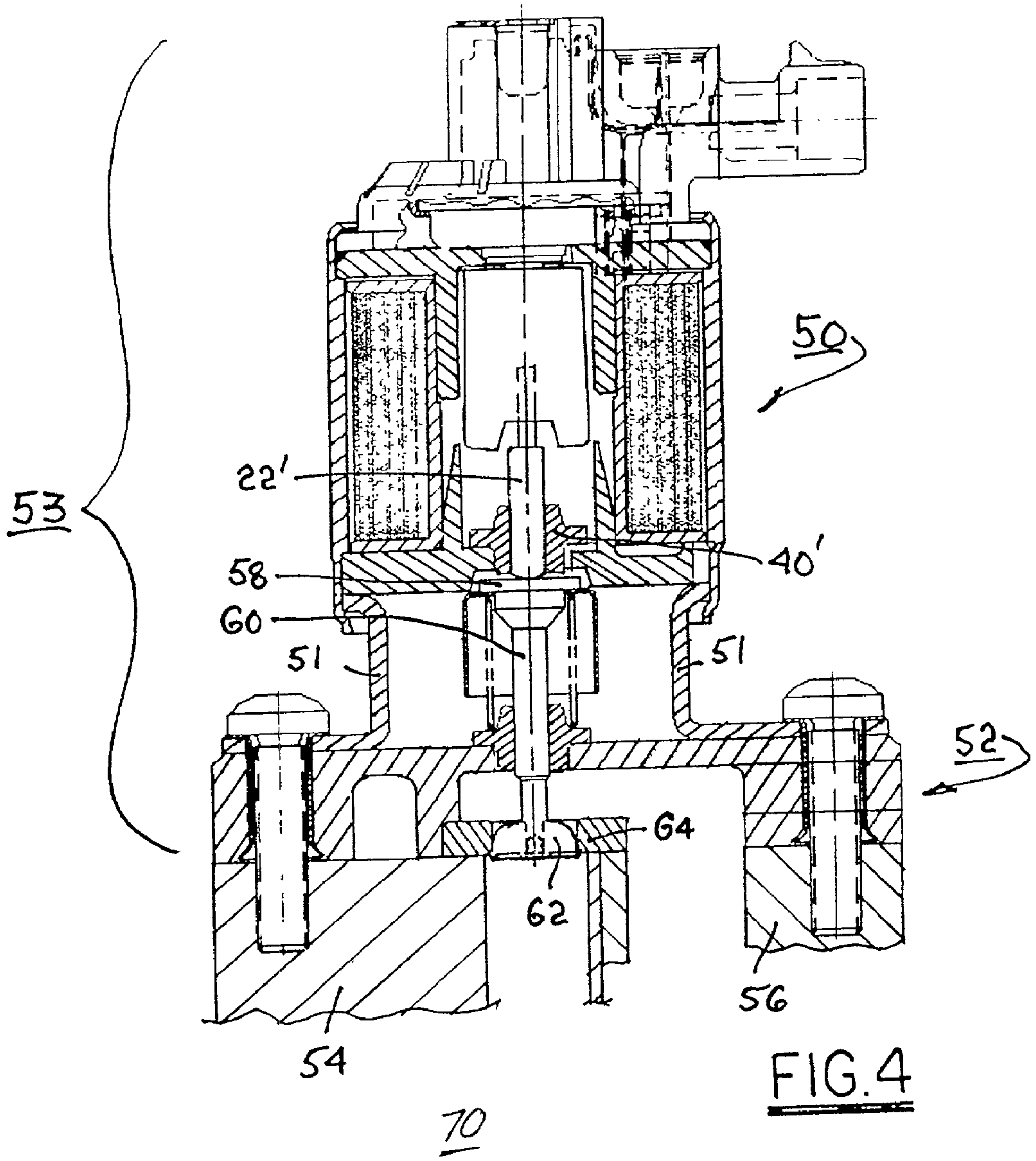
FIG. 4 is a cross-sectional view of an actuator in accordance with the invention operationally attached to an exhaust gas recirculation (EGR) valve on an internal combustion engine.

Referring to FIG. 4, a second embodiment 50 of a solenoid actuator in accordance with the invention is shown mounted via standoffs 51 onto an EGR valve 52 to form an EGR valve assembly 53 which is bolted to the exhaust manifold 54 and intake manifold 56 of an internal combustion engine. Embodiment 50 has a spool bearing 40' instead of sleeve bearing 40. Shaft 22' engages the outer end 58 of the pintle 60 of valve 52 to open and close valve head 62 from valve seat 64 to selectively admit exhaust gases from exhaust manifold 54 into intake manifold 56 to reduce smog emitted by the engine 70.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A solenoid for providing linear actuation, comprising:

a) first and second polepieces having axial bores coaxially disposed along a common axis;

b) an electrical conductor wound about said polepieces in a plurality of turns;

c) an armature movably disposed in said axial bores, wherein said armature includes an outer surface, wherein at least a portion of said outer surface is frusto-conical, said frusto-conical portion of said outer surface being adjacent to a substantial portion of said first and second polepieces;

d) a bearing axially retained in one of said first and second polepieces, said axial bore of said polepiece not retaining said bearing being non-frusto-conical; and e) a shaft attached coaxially to said armature and extending through a supportive bore in said bearing wherein said bearing radially supports said shaft, said shaft being axially displaceable by electromagnetic displacement of said armature to provide said actuation, wherein said armature is entirely separated from said axial bores of said polepieces by an air gap, and wherein the armature is prevented from contacting the polepieces.

2. A solenoid in accordance with claim 1 wherein said solenoid is included in an actuator attachable to a device for providing linear actuation to said device.

3. A valve assembly for exhaust gas recirculation between the exhaust manifold and the intake manifold of an internal combustion engine, said assembly including an exhaust gas recirculation valve and further including a solenoid actuator attached to said valve, said solenoid actuator having first and second polepieces having axial bores coaxially disposed along a common axis, an electrical conductor wound about said polepieces in a plurality of turns, an armature movably disposed in said axial bores, said armature including an outer surface, wherein at least a portion of said outer surface is frusto-conical, said frusto-conical portion of said outer surface being adjacent to a substantial portion of said first and second polepieces, a bearing axially retained in one of said first and second polepieces, said axial bore of said polepiece not retaining said bearing being non-frusto-conical, and a shaft attached coaxially to said armature and extending through a supportive bore in said bearing wherein said bearing radially supports said shaft, said shaft being axially displaceable by electromagnetic displacement of said armature to provide actuation of said valve, wherein said armature is entirely separated from said axial bores of said polepieces by an air gap, and wherein the armature is prevented from contacting the polepieces.

4. A solenoid in accordance with claim 3 wherein said bearing has an axial length that is at least 1.5 times larger than the diameter of said shaft.

5. An internal combustion engine, comprising:

a) an intake manifold;

b) an exhaust manifold; and c) a valve assembly for exhaust gas recirculation between said exhaust manifold and said intake manifold, said assembly including an exhaust gas recirculation valve and further including a solenoid actuator attached to said valve and having first and second polepieces having axial bores coaxially disposed along a common axis, an electrical conductor wound about said polepieces in a plurality of turns, an armature movably disposed in said axial bores, said armature including an outer surface, wherein at least a portion of said outer surface is frusto-conical, said frusto-conical portion of said outer surface being adjacent to a substantial portion of said first and second polepieces, a bearing axially retained in one of said first and second polepieces, said axial bore of said polepiece not retaining said bearing being non-frusto-conical, and a shaft attached coaxially to said armature and extending through a supportive bore in said bearing wherein said bearing radially supports said shaft, said shaft being axially displaceable by electromagnetic displacement of said armature to provide actuation of said valve to admit exhaust gas from said exhaust manifold into said intake manifold, wherein said armature is entirely separated from said axial bore of said polepieces by an air gap, and wherein the armature is prevented from contacting the polepieces.

6. A solenoid in accordance with claim 5 wherein said bearing has an axial length that is at least 1.5 times larger than the diameter of said shaft.

7. A solenoid for providing linear actuation, comprising:

a) a housing;

b) first and second polepieces, within said housing, having axial bores coaxially disposed along a common axis;

c) an electrical conductor wound about said polepieces in a plurality of turns;

d) an armature movably disposed in said axial bores, wherein said armature includes an outer surface, wherein at least a portion of said outer surface is frusto-conical, said frusto-conical portion of said outer surface being adjacent to a substantial portion of said first and second polepieces;

e) a bearing axially retained in one of said first and second polepieces, said axial bore of said polepiece not retaining said bearing being non-frusto-conical; and f) a shaft attached coaxially to said armature and extending through a supportive bore in said bearing wherein said bearing radially supports said shaft, said shaft being axially displaceable by electromagnetic displacement of said armature to provide said actuation, wherein said armature is entirely separated from said axial bore of said polepieces by an air gap, and wherein the armature is prevented from contacting the polepieces.

8. A solenoid in accordance with claim 7 wherein said solenoid is included in an actuator attachable to a device for providing linear actuation to said device.

9. A solenoid in accordance with claim 7 wherein said bearing has an axial length that is at least 1.5 times larger than the diameter of said shaft.

10. A solenoid for providing linear actuation, comprising:

a) first and second polepieces having axial bores coaxially disposed along a common axis;

b) an electrical conductor wound about said polepieces in a plurality of turns;

c) an armature movably disposed in said axial bores;

d) a bearing axially retained in one of said first and second polepieces; and e) a shaft attached coaxially to said armature and extending through a supportive bore in said bearing wherein said bearing radially supports said shaft, said shaft being axially displaceable by electromagnetic displacement of said armature to provide said actuation, wherein said armature is entirely separated from said axial bores of said polepieces by a generally cylindrical air gap, and wherein said bearing has an axial length that is at least 1.5 times larger than the diameter of said shaft.

* * * * *